US008069976B1

(12) United States Patent
Fortenbery et al.

(10) Patent No.: US 8,069,976 B1
(45) Date of Patent: Dec. 6, 2011

(54) CONVEYOR BELT DECK AND FRAME HAVING A SUBSTANTIALLY VERTICAL MAINTENANCE POSITION

(75) Inventors: J. David Fortenbery, Charlotte, NC (US); Aric Benedict, Monroe, NC (US); David Patrick Erceg, Concord, NC (US); Andrew B. Fortenbery, Charlotte, NC (US)

(73) Assignee: Mantissa Corporation, Charlotte, NC (US)

( * ) Notice: Subject to any disclaimer, the term of this patent is extended or adjusted under 35 U.S.C. 154(b) by 0 days.

(21) Appl. No.: 12/838,936

(22) Filed: Jul. 19, 2010

Related U.S. Application Data

(62) Division of application No. 11/235,438, filed on Sep. 26, 2005, now Pat. No. 7,757,842.

(51) Int. Cl.
*B65G 15/12* (2006.01)
*B65G 23/44* (2006.01)

(52) U.S. Cl. ............... 198/860.1; 198/814; 198/817

(58) Field of Classification Search .................. None
See application file for complete search history.

(56) References Cited

U.S. PATENT DOCUMENTS

| | | | |
|---|---|---|---|
| 2,764,031 A | 7/1953 | Nystrom ................... 74/242.14 |
| 3,627,106 A | 12/1971 | Winfield ...................... 198/34 |
| 3,627,108 A | 12/1971 | Hansen ....................... 198/102 |
| 3,635,327 A | 1/1972 | Thiessen ..................... 198/126 |
| 4,567,906 A | 2/1986 | Brule .......................... 134/127 |
| 4,567,909 A | 2/1986 | Schebler et al. ............. 137/81.1 |
| 4,712,650 A | 12/1987 | Campbell ...................... 186/41 |
| 4,987,994 A | 1/1991 | Kelsey ........................ 198/811 |
| 5,022,514 A | 6/1991 | Lofberg ....................... 198/813 |
| 5,083,657 A | 1/1992 | Kelsey ........................ 198/811 |
| 5,164,777 A | 11/1992 | Agarwal et al. ............. 355/212 |
| 5,172,804 A | 12/1992 | Chersin ..................... 198/861.5 |
| 5,836,436 A | 11/1998 | Fortenbery et al. ...... 198/370.03 |
| 6,073,755 A | 6/2000 | Hilliard et al. .............. 198/813 |
| 6,182,815 B1 | 2/2001 | Eggebrecht et al. ....... 198/468.1 |
| 6,206,170 B1 | 3/2001 | Kissel et al. ............... 198/370.4 |
| 6,336,550 B1 | 1/2002 | Muntener ................... 198/806 |
| 6,484,869 B1 * | 11/2002 | Brouwer et al. ............ 198/592 |
| 6,708,813 B2 * | 3/2004 | Takahashi ................. 198/369.2 |
| 6,745,893 B2 | 6/2004 | Von Wedel .................. 198/763 |
| 6,811,018 B2 | 11/2004 | Cotter et al. ................ 198/460.1 |

* cited by examiner

Primary Examiner — Kavel Singh
(74) *Attorney, Agent, or Firm* — MacCord Mason PLLC

(57) ABSTRACT

A conveyor system apparatus including: a primary conveyor; and a conveying belt comprising: a belt deck comprising a conveyor belt; and a frame supporting the belt deck, the frame comprising a base and a deck support coupled to the base and the belt deck, the deck support movable between an operating position and a maintenance position. In as embodiment of the invention, the belt deck is cantilevered from the frame. Also, in an embodiment, the frame includes a motor for moving the deck support with respect to the base.

13 Claims, 4 Drawing Sheets

CONVEYOR BELT DECK AND FRAME HAVING A SUBSTANTIALLY VERTICAL MAINTENANCE POSITION

CROSS-REFERENCE TO RELATED PATENTS

The present disclosure is a divisional application of commonly owned U.S. patent application Ser. No. 11/235,438, filed Sep. 26, 2005, titled "Conveyor Belt Deck and Frame Having a Substantially Vertical Maintenance Position" now U.S. Pat. No. 7,757,842 issued Jul. 20, 2010, and related to commonly owned U.S. patent application Ser. No. 10/824,198, filed Apr. 14, 2004, titled "Cantilevered Conveying Belt for a Sortation System" now U.S. Pat. No. 7,232,029 issued Jun. 19, 2007.

BACKGROUND OF THE INVENTION (1) Field of the Invention

The present invention relates generally to conveyor systems and, more particularly, to a frame for a belt deck for a conveying belt for a conveyor system.

(2) Description of the Prior Art

In the package sorting conveyor industry, often a main conveyor is loaded with packages from a shorter, secondary conveyor. Belt inductors are used to move the packages from the secondary conveyor to the main conveyor. The belt inductors typically include a plurality of relatively narrow conveyor belts around a pair of rollers on a belt deck driven by a motor. Wear from conveying packages eventually subjects the narrow belts of the inductor to failure. When failure of one of the belts on the belt inductor occurs, the main conveyor may have to be shut down to replace the failed belt of the belt inductor. Attempts have been made to increase the life of the belts of the belt inductor, but even the improved belts still eventually fail. Thus, there is need for a conveyor system having a conveying belt such as a belt inductor, where the belts of the conveying belt can be changed without shutting down the main conveyor.

SUMMARY OF THE INVENTION

The present invention is directed to a conveyor system apparatus including: a primary conveyor; and a conveying belt comprising: a belt deck comprising a conveyor belt; and a frame supporting the belt deck, the frame comprising a base and a deck support coupled to the base and the belt deck, the deck support movable between an operating position and a maintenance position. In an embodiment of the invention, the belt deck may be cantilevered from the frame. Also, in an embodiment, the frame may include an actuator for moving the deck support with respect to the base.

In an embodiment of the system, the deck support may be pivotal about a horizontal axis. The deck support may include a mounting plate. The axis of rotation may be substantially parallel to the mounting plate. The frame may include a hinge coupled to the base and the deck. The base and deck support may include tubular longitudinal and elevation members. The frame actuator may include a pneumatic cylinder. The deck support may be configured to support a belt deck disposed horizontally in the operating position and disposed substantially vertically in the maintenance position, and the base may include a portion that may be triangular. The deck support may include a triangular portion such that the triangular portion of the deck support rests atop the triangular portion of the base when the belt deck is in the operating position.

In an embodiment of the invention, the conveyor system may include an upstream accumulator. The upstream accumulator may include: a frame; at least one belt; at least one pair of opposed rollers; and a motor attached to at least one of said rollers. The conveyor system further may include an accumulator control system. The accumulator control system may include: a package "on" detector and a package "off" detector, and the accumulator control system may further comprise a control interface to said primary conveyor.

In an embodiment of the invention, the belt deck may include a belt tension assembly. A portion of the deck may be trapezoidal shaped. The deck may include a plurality of extruded tubes. The tubes may be joined to one another with finger splices. The cantilevered frame may further comprise a support arm having one end selectively moveable to the cantilevered deck. The support arm may include a first connector attached to the base and a second connector attached to the cantilevered deck. The first connector may include a hinge. The second connector may include a locking mechanism, and the locking mechanism may include an over center latch and a secondary spring lock. The conveying belt further may include a belt drive coupled to the frame. The belt drive may include a plurality of belts, a pair of opposed rollers, and a motor attached to one of the rollers.

Accordingly, one aspect of the present invention is to provide a conveyor system apparatus including: a primary conveyor; and a conveying belt including: a belt deck comprising a conveyor belt; and a frame supporting the belt deck, the frame comprising a base and a deck support coupled to the base and the belt deck, the deck support movable between an operating position and a maintenance position.

Another aspect of the present invention is to provide a frame apparatus for a belt deck for a conveying belt, the frame apparatus including: a base; a deck support coupled to the base and movable with respect to the base between an operating position and a maintenance position; and a motor for moving the deck support with respect to the base.

Still another aspect of the present invention is to provide a conveyor system apparatus comprising: primary conveyor; and a conveying belt comprising: a frame supporting a cantilevered belt deck, the frame comprising a base and a deck support coupled to the base and the belt deck, the deck support movable between an operating position and a maintenance position; and an actuator for moving the deck support with respect to the base.

These and other aspects of the present invention will become apparent to those skilled in the art after a reading of the following description of the preferred embodiment when considered with the drawings.

DESCRIPTION OF THE PREFERRED EMBODIMENTS

Figure 1:
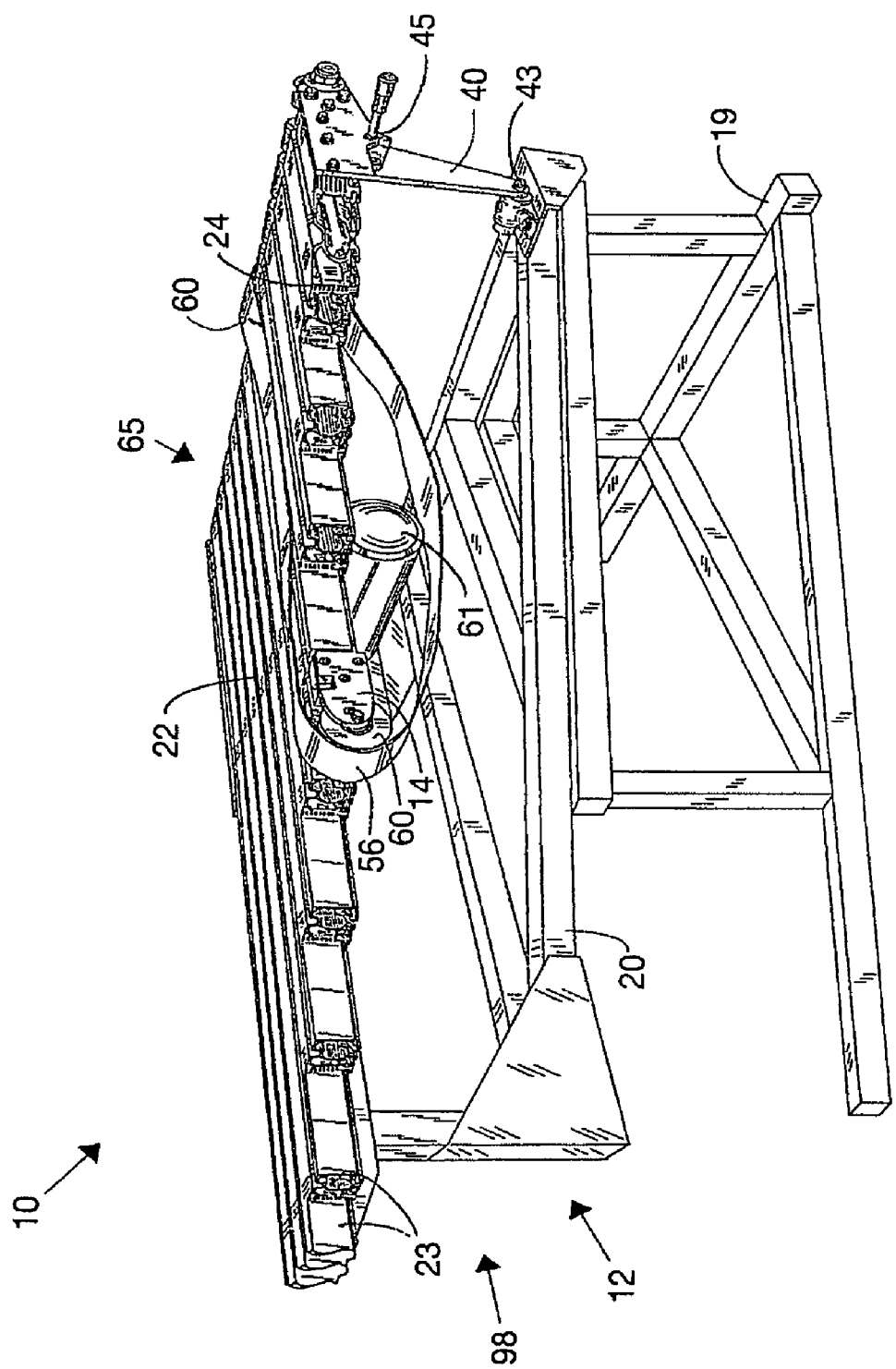
FIG. 1 is a side perspective view of a conveying belt for a conveyor system constructed according to an embodiment of the invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1 shows a conveying module 10 for a conveyor system constructed according to an embodiment of the present invention. The conveying module 10 includes a belt deck 22. The belt deck 22 includes a conveyor belt 56, and a frame 12 supporting the belt deck 22. The frame 12 includes a base 19 and a deck support 20 coupled to the base 19 and the belt deck 22. In a preferred embodiment of the invention, the deck support 20 and the belt deck 22 are movable between an operating position 98, shown in FIG. 1, and a maintenance position 99, shown in FIG. 3.

In an embodiment of the invention, the belt deck 22 is cantilevered from the frame 12, although the belt deck 22 can be attached to the frame 12 in any fashion. The belt deck 22 includes a belt tension assembly 14. In one embodiment, a portion of the deck 22 is trapezoidal shaped. The deck 22 may also be triangular, square, rectangular, or one of many other shapes. The belt deck 22 may include a plurality of extruded tubes 23. The plurality of extruded tubes 23 may be joined to one another with finger splices 24.

In an embodiment of the invention, the frame 12 includes a support arm 40 having one end selectively moveable to the belt deck 22. The support arm 40 may include a first connector 43 attached to the base 12 and a second connector 45 attached to the belt deck 22. The first connector may include a hinge, and the second connector may include a locking mechanism. The locking mechanism may include an over center latch and a secondary spring lock. The conveying module 10 may further include a belt drive 65 coupled to the frame 12. The belt drive 65 may include a plurality of belts 56, a pair of opposed rollers 60, and a motor 61 attached to one of the rollers 60.

Figure 2:
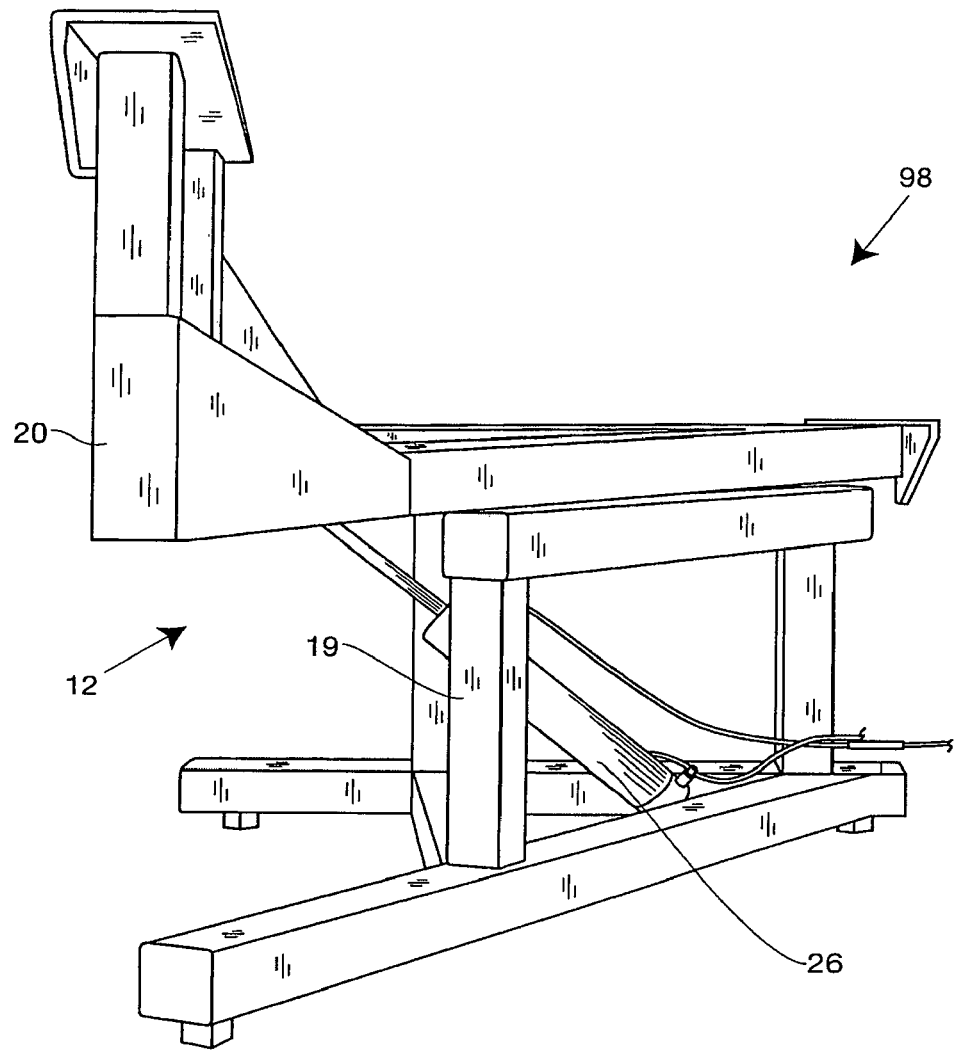
FIG. 2 is a front perspective view of a frame for a conveying belt for the conveyor system.

FIG. 2 shows a frame 12 for a belt deck constructed according to an embodiment of the invention with the deck support 20 of the frame 12 in the operating position 98. The frame 12 includes a base 19 below the deck support 20. An actuator 26 for moving the deck support 20 with respect to the base 19 is also shown.

Figure 3:
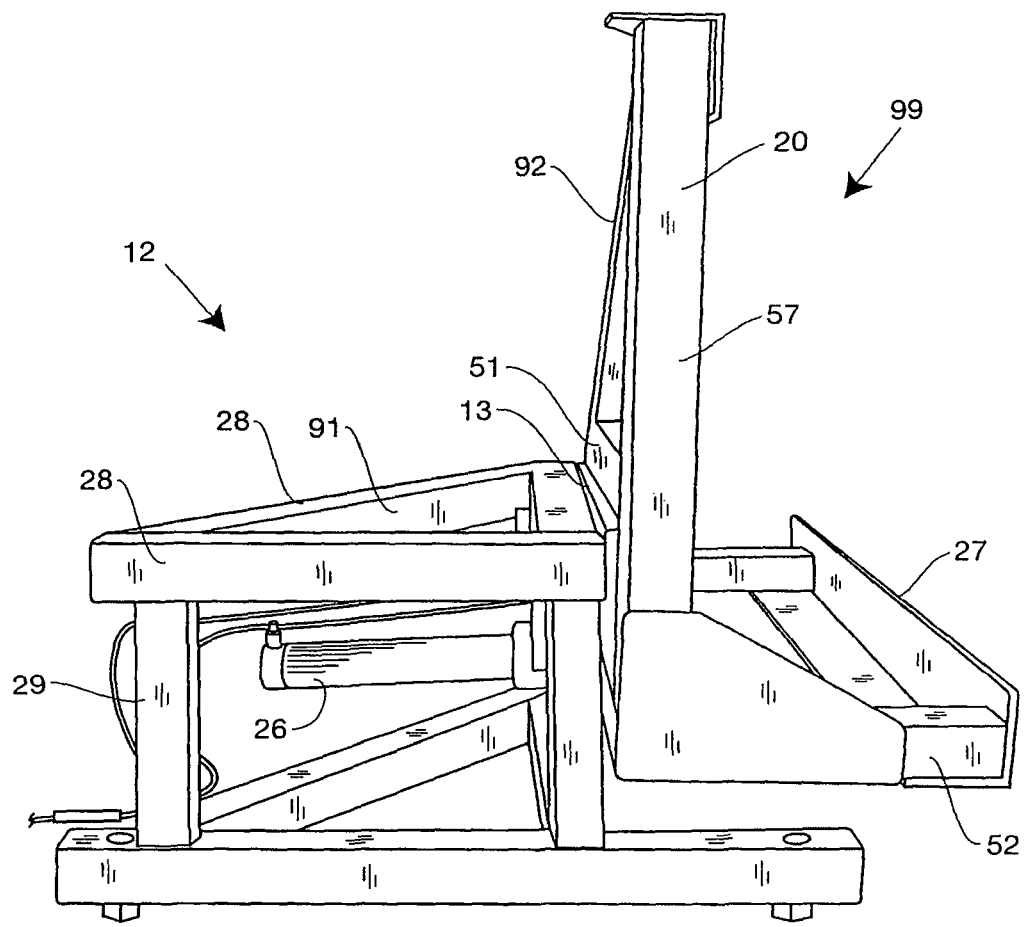
FIG. 3 is a rear perspective view of the frame.

FIG. 3 shows the frame 12 constructed according to an embodiment of the invention. With the belt deck 22 attached to the deck support 20 of the frame 12 as shown in FIG. 1, movement of the deck support 20 to the position shown in FIG. 2 places the deck support 20 and the belt deck in the maintenance position. The deck support 20 is configured to support a belt deck 22 disposed horizontally in the operating position 98 and disposed substantially vertically in the maintenance position 99. The belt deck support 20 is pivotal about a horizontal axis of rotation. The deck support 20 includes a mounting plate 27. The axis of rotation about which the belt deck 20 support pivots may be substantially parallel to the mounting plate 27. In one embodiment, the base 19 comprises a triangular portion 91 and the deck support 20 comprises a triangular portion 92 such that the triangular portion 92 of the deck support 20 rests atop the triangular portion 91 of the base 19 when the belt deck (shown in FIG. 1) is in the operating position 98. Both the base 19 and the deck support 20 may comprise portions in other shapes such as trapezoidal, square, rectangular, and many other shapes.

Further, in an embodiment of the invention, the frame 12 includes a hinge 13 coupled to the base 19 and the deck support 20 and the base 19 includes longitudinal members 28 and elevation members 29. In the preferred embodiment, the longitudinal members 28 and the elevation members 29 of the base 19 of the frame 12 are tubular. However, the longitudinal members 28 and the elevation members 29 of the base 19 of the frame 12 may be other shapes. The deck support 20 also comprises longitudinal members 51 and elevation members 52. The longitudinal members 51 and the elevation members 52 of the deck support 20 are also tubular. The actuator 26 for moving the deck support 20 with respect to the base 19 may include a pneumatic cylinder, hydraulic cylinder, ball screw actuator, or other such device.

Figure 4:
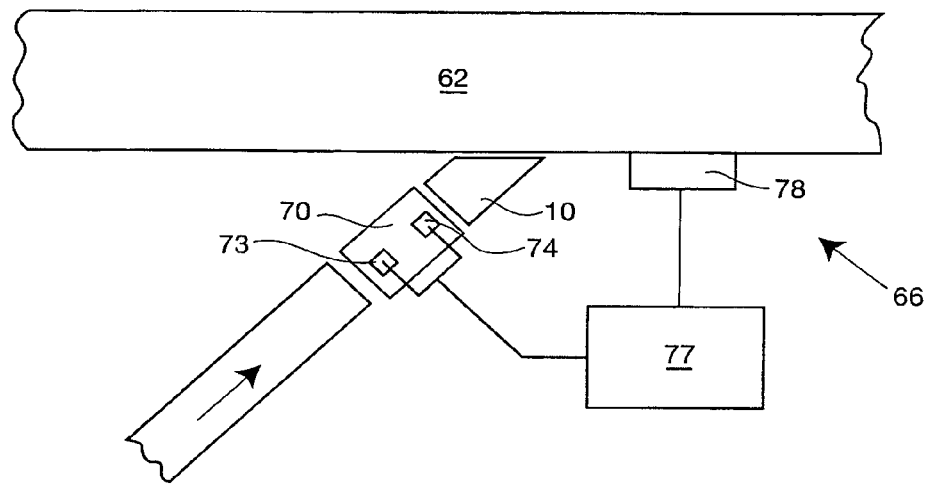
FIG. 4 is a schematic diagram representing the conveyor system.

FIG. 4 shows a preferred embodiment of the invention, where the conveyor system 66 includes a primary conveyor 62, the conveying module 10, and an upstream accumulator 70. The accumulator includes an accumulator control system 77. The accumulator control system 77 includes a package "on" detector 73 and a package "off" detector 74. The accumulator control system 77 includes a control interface 78 to the primary conveyor 62.

Figure 5:
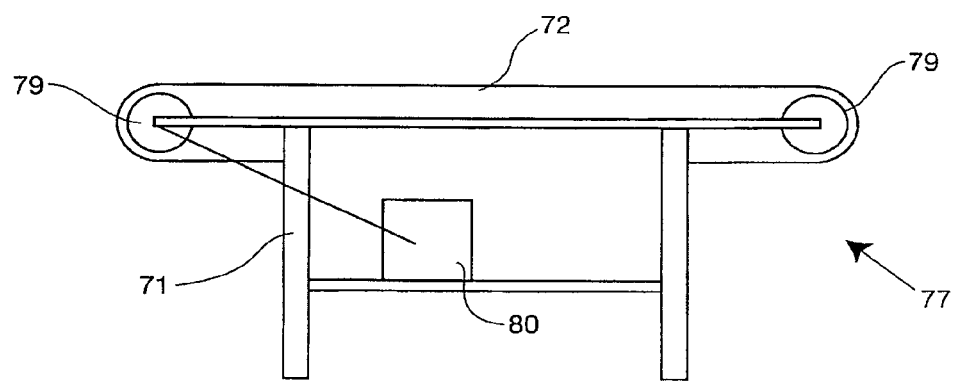
FIG. 5 is a side view of an upstream accumulator for the conveyor system.

FIG. 5 shows the upstream accumulator 77. In a preferred embodiment of the invention, the upstream accumulator 77 includes a frame 71 and at least one belt 72. The accumulator 77 also includes at least one pair of opposed rollers 79 and a motor 80 attached to at least one of the rollers 79.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. A frame apparatus for a belt deck for a conveying belt adjacent to a primary conveyor, the frame apparatus comprising:
   (a) a base;
   (b) a cantilevered deck support;
   (c) an actuator for moving the deck support with respect to the base;
   (d) a support arm having a first connector including a hinge attached to the base; and
   (e) a second connector including a locking mechanism selectively moveable to the cantilevered deck support, whereby the deck support is configured to be cantilevered between a horizontal operating position and a substantially vertical maintenance position and adapted to allow said primary convey to convey when said cantilevered deck support is in both said horizontal operating position and said vertical maintenance position.

2. The apparatus according to claim 1, wherein the deck support is pivotal about an axis.

3. The apparatus according to claim 2, wherein the axis is horizontal.

4. The apparatus according to claim 3 wherein the deck support comprises a mounting plate.

5. The apparatus according to claim 4 wherein the axis is substantially parallel to the mounting plate.

6. The apparatus according to claim 2 further comprising a hinge coupled to the base and the deck.

7. The apparatus according to claim 1, wherein the base comprises longitudinal members and elevation members.

8. The apparatus according to claim 7, wherein the longitudinal members and the elevation members are tubular.

9. The apparatus according to claim 1 wherein the deck support comprises longitudinal members and elevation members.

10. The apparatus according to claim 9, wherein the longitudinal members and the elevation members are tubular.

11. The apparatus according to claim 1, wherein the actuator comprises a pneumatic cylinder.

12. The apparatus according to claim 1, wherein the deck support is configured to support a belt deck a disposed horizontally in the operating position and disposed substantially vertically in the maintenance position.

13. The apparatus according to claim 1 wherein the base comprises a triangular portion and the deck support comprises a triangular portion such that the triangular portion of the deck support rests atop the triangular portion of the base when the belt deck is in the operating position.

* * * * *